United States Patent [19]

Ohlrogge et al.

[11] E Re. 30,648

[45] Reissued Jun. 16, 1981

[54] CHAIR FOR DENTAL PATIENTS

[75] Inventors: Wilhelm Ohlrogge, Uelzen-Veerssen; Walter Hetz, Erlangen, both of Fed. Rep. of Germany

[73] Assignee: Siemens Aktiengesellschaft, Berlin & Munich, Fed. Rep. of Germany

[21] Appl. No.: 912,233

[22] Filed: Jun. 2, 1978

Related U.S. Patent Documents

Reissue of:

[64] Patent No.: 3,806,192
Issued: Apr. 23, 1974
Appl. No.: 264,211
Filed: Jun. 19, 1972

[30] Foreign Application Priority Data

Aug. 16, 1971 [DE] Fed. Rep. of Germany ..... 2141022

[51] Int. Cl.[2] ..... A61G 15/00
[52] U.S. Cl. ..... 297/318; 297/421
[58] Field of Search ..... 297/318, 317, 322, 330, 297/76, 68, 417

[56] References Cited

U.S. PATENT DOCUMENTS

| | | | |
|---|---|---|---|
| 454,912 | 6/1891 | Lockstaedt | 297/76 |
| 2,016,133 | 10/1935 | Chandler | 297/318 |
| 2,479,175 | 8/1949 | McArthur | 297/318 |
| 2,497,395 | 2/1950 | Cramer | 297/318 |
| 2,629,425 | 2/1953 | James | 297/317 |
| 2,633,181 | 3/1953 | Bell | 297/317 |
| 2,677,412 | 5/1954 | Thomas | 297/322 X |
| 2,746,523 | 5/1956 | de la Cuesta | 297/322 |
| 3,138,805 | 6/1964 | Piazza | 297/417 |
| 3,381,997 | 5/1968 | Fritz et al. | 297/330 X |
| 3,427,072 | 2/1969 | Hale | 297/330 X |
| 3,578,379 | 5/1971 | Taylor et al. | 297/330 |
| 3,719,391 | 3/1973 | Neri | 297/330 |

FOREIGN PATENT DOCUMENTS

| | | | |
|---|---|---|---|
| 1940646 | 2/1971 | Fed. Rep. of Germany | 297/330 |

*Primary Examiner*—Francis K. Zugel
*Attorney, Agent, or Firm*—Hill, Van Santen, Steadman, Chiara & Simpson

[57] ABSTRACT

A chair for dental patients has a lower portion and an upper portion including a swingable back and a seat movable when the back is swung. The seat is connected at its rear end by a hinge with the lower end of the back. The invention is particularly characterized in that the seat is mounted upon the lower portion so as to be movable in the longitudinal direction of the chair, while the back is guided over a rigid guide which is connected with the lower portion and the back. Means are provided in the part of the seat free from the hinge between it and the lower portion which are operable when the back is swung to tip the seat about a horizontal axis toward the back.

13 Claims, 5 Drawing Figures

CHAIR FOR DENTAL PATIENTS

Matter enclosed in heavy brackets [ ] appears in the original patent but forms no part of this reissue specification; matter printed in italics indicates the additions made by reissue.

This invention relates to a chair for dental patients having an inclinable back and an adjustable seat. The invention is particularly concerned with a chair for dental patients having a lower portion and an upper portion including a swingable back and a seat movable upon the lower portion in the longitudinal direction of the chair when the back is swung and connected at its rear end by a hinge with the lower end of the back.

Treatments and working methods developed during the recent years in dental medicine place certain requirements upon a dental patients chair. Thus the chair must be adapted for the seated patient as well as for a lying patient including all intermediate positions and the different working positions of the dentist (direct or indirect manner of working) must be also taken into consideration.

It is known, as far as patients chairs of the usual type are concerned, that when the back is raised (for example, for bringing a patient from a lying position to a sitting position which is necessary when treatment of the lower [jar] *jaw* follows that of the upper jaw) the distance of the head of the patient from the dentist and from the instruments is changed. The result is that the dentist not only has to change his working position but must also adjust the location of the instruments, plates, lights, etc.

To avoid these drawbacks patients chairs have been developed wherein the seat is moved in the longitudinal direction of the chair when the back is inclined or raised. When the back is raised the head of the patient sitting upon the chair does not move circularly any more,—with the hinge connecting the back with the seat as the rotary axis,—but is moved only vertically. The distance of the mouth of the patient to the instrument and the dentist or his assistant remains substantially the same.

For this purpose, a known examining and treating chair has a back provided with a running surface and an outer support with rollers located between them which are arranged on a fixed link connected with the base. The seat which is connected with the back by a hinge, is moved upon a sliding surface when the back is inclined.

This chair construction has, among others, the drawback that the fixed link and the running surfaces for the rollers require a comparatively large space behind the back, so that freedom of knee movement for the dentist and his assistant is greatly limited, particularly in a sitting working position and when the back is inclined rearwardly to a great extent.

An object of the present invention is to improve existing constructions.

Another object is the provision of a chair for dental patients which can be used in a large number of ways and which nevertheless has a simple structure.

A further object is the provision of a chair well suited for treating lying patients in modern ways.

For that purpose it is necessary that the rear side of the back should be substantially free from guiding and supporting parts for the back and the seat, so that it should be as flat as possible and provide great freedom for the knees of the dentist. However, advantages of known chair constructions should be fully retained wherein when the position of the chair is changed, the distance of the dentist or his assistant from the mouth of the patient is substantially unchanged, so that no corrections are necessary when the treating position is changed. Furthermore the adjusting mechanism of the chair parts should be operated as easily as possible.

Yet another object of the present invention is to construct a chair for dental patients in such manner that the patient can assume a relaxed and convenient position thereon in all lying and sitting positions. This is particularly necessary for working positions wherein the back is inclined rearwardly to a very large extent (fully indirect treating position with a lying patient). In that position the patient can easily get the feeling of helplessness which can then cause him to assume a cramped position.

Other objects of the present invention will become apparent in the course of the following specification.

In the accomplishment of the objectives of the present invention it was found advisable to mount the seat upon the base so that it is movable in the longitudinal direction of the chair, while the back is guided over rigid rods which are connected with the base and the back. Furthermore, means are provided in the part of the seat between it and the base which are operable when the back is inclined to tip the seat about a horizontal axis toward the back.

This construction of the present invention provides a substantial advantage over known chair constructions as far as the location of the patient is concerned. Due to this construction the patient has a secure hold even in an extreme lying position (with the head practically horizontal), since his body will not lie in a completely stretched position, but his legs will be somewhat bent relatively to his body due to the slight tipping of the seat.

Thus the construction of the present invention makes it possible [chair.] *to* couple the movements of the back and the seat as a tipping and at the same time to carry out a longitudinal movement of the lower part of the [chari] *chair*. The structural depth of the back does not have to be increased for this purpose. By coupling three movements of the chair with each other substantial advantages are produced since only a single drive is required for actuating the chair. The resulting advantages consist not only in smaller manufacturing costs, which are particularly high in program-actuated chairs, since here only a single operating circuit is required, but they also provide servicing advantages. The dentist can actually operate the three chair movements by actuating a single button, providing the adjustment of the entire upper chair portion. On the other hand, in case of individual drives, he would have had to operate separately the three movements and to adjust them relatively to each other. A further advantage consists in the simple structure of the chair, particularly the setting mechanism.

The construction of the present invention solves the problem of eliminating to a great extent relative movements between the back of the patient and the supporting surface of the back when the back is swung, without it being necessary to shift the rotary axis of the back greatly forwards and upwardly, as is often the case in known patients chairs.

It is advantageous to provide the movable support of the hinge upon the upper part of the chair in such manner that either the hinge is mounted upon a straight guide with a horizontal guide path provided upon the lower part of the chair, or that the hinge is mounted by a rod upon the lower part of the chair. In case of the first-mentioned construction it is advantageous to make the straight guide as a slide guide *or crosshead guide of a crosshead guide assembly.*

Means for tipping the seat when the back is inclined can consist advantageously of a supporting arm arranged between the seat and the lower part of the chair. The arm supports the seat when the back is inclined relatively to the lower part and tips the seat toward the back. A further advantageous embodiment consists in providing a curved member upon the seat or the lower part of the chair in the seat part free from the hinge for the tipping of the seat, a roll member or the like being used as a support of the chair lower part or the seat engaging the curved member.

In accordance with a further embodiment of the present position the best possible lying position is attained when the curved member is so shaped, or according to another suggestion, when the size of the supporting arm or its attachment are so selected, that the tipping of the seat starts only when the back is inclined by more than 25° to the vertical.

The hinge of the rigid guide belonging to the lower part of the chair as well as that of the supporting arm can be combined into a slide stone movable along a straight guide.

The invention will appear more clearly from the following detailed description when taken in connection with the accompanying drawing showing by way of example only, preferred embodiments of the inventive idea.

In the drawing.

In all Figures the same parts are indicated by the same numerals.

Figure 1:
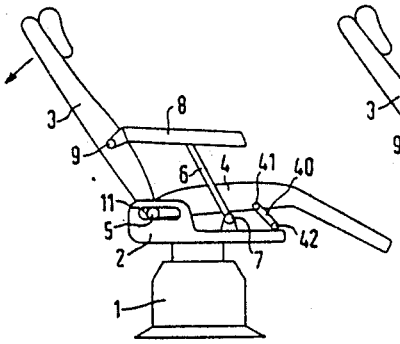
FIG. 1 is a simplified side view of a chair for dental patients constructed in accordance with the present invention.

FIG. 1 shows a chair for dental patients having a base 1 and a lower chair portion 2 adjustable in height relatively to the base. The lower chair part 2 carries a back 3 and a seat 4 which jointly form the upper part of the chair. The rear end of the seat 4 is connected by a hinge 5 with the back 3. The hinge 5 *is a crosshead of a crosshead guide assembly and* is supported in a straight [guide 11] *guide or crosshead guide 11 of a crosshead guide assembly* mounted upon the lower chair part 2 to provide longitudinal movement of the seat 4. The straight guide 11 has a substantially horizontal guiding path.

In the drawing the guide 11 is supposed to represent a slide guide. Obviously the slide guide can be replaced by a roller guide.

The back 3 is guided by rods 6 and 8, the rod 6 being pivoted at 7 to the lower chair part 2 while the rod 8 is connected by the pivot 9 with the back 3. The rods 6 and 8 are rigidly interconnected. The seat 4 is swingably connected in the part free from the hinge 5 with the lower chair portion 2 by a supporting arm 40. Pivots attached to the ends of the arm 40 are indicated as 41 and 42. It is apparent from the drawing that when the back 3 is inclined, the entire upper chair part 3, 4 is movable upon the straight guide 11. The supporting arm 40 is of such length and the pivots 41 and 42 are so arranged that when the back 3 is inclined in the direction of the arrow, the seat 4 is easily raised toward the back. Obviously, when the back is raised the seat is lowered. The easy raising of the front part of the seat (foot support) when the back is inclined provides a particularly good hold and seating without tension for a patient sitting upon the chair. As shown in the drawing, the tipping takes place about an axle 5 common to back 3 and seat 4.

Figure 3:
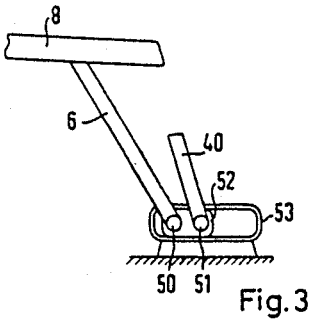
FIG. 3 is an enlarged side view of a part of a mechanism shown in FIG. 2.

The arrangement of the pivot 9 along the back need not be that shown in the drawing. Obviously it must not coincide with the hinge 5. Preferably the pivot 7 and pivot 50 of FIG. 3 are so arranged as far as their height is concerned that when the back is lowered to a great extent an imaginery straight line [extruding] *extending* between the pivots 9 and 7, or between pivots 9 and 50 will be always located above the hinge 5. The end pivots of the hinge are constructed as slide stones *or crossheads* which can easily move in the path of the straight guide 11. The rigid rod connection 6, 8 serves at the same time as an arm support and is arranged on both sides of the chair. One of these arm supports is preferably so constructed that its rods can be changed by simple manipulation from a rigid condition to a non-rigid condition so that the arm support can be moved to a position which will help the patient to get off the chair. For that purpose the rods can be made of two parts and provided with a lockable coupling member permitting the rods to be rigid in a coupled condition and swinging them into an open position when uncoupled.

Figure 5:
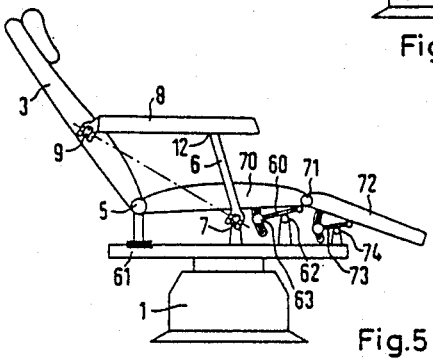
FIG. 5 is a side view of yet another chair construction.

In the embodiment shown in FIG. 5 the pivots 9 and 7 are constructed as cardan joints with both cardan axes extending in the direction of the connection 7–9. This arrangement makes possible a single side swinging of the arm support into a get off position (about the diagonal 9–7 of the rectangle 9, 5, 7, 12 as the swinging axis), so that it is not necessary to provide a special device, such as a telescopic support or the like for this purpose, as is the case in prior art arm supports. From the drawing it is apparent that in a folded position the arm 9–12 of the arm support substantially covers the side 9–5 of the back and the arm 12–7 covers the side 5–7. Thus when the arm support is folded the patient can easily leave the chair. A further advantage consists in that the arm support can be folded inwardly to some extent and thus provide a better hold, particularly for small children.

The construction of the present invention makes it possible to provide good compensation for forces exerted in different directions by the weight of the patient upon the chair. It is apparent from the drawing that forces acting upon the back have the tendency of moving the chair forward (toward the foot end of the chair), while the forces upon the inclined rising seat have the tendency of moving the chair rearwardly (toward the head end of the chair). The two forces are opposed and nearly balance each other.

Figure 2:
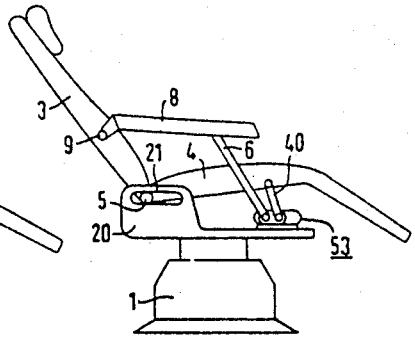
FIG. 2 is a side view of a somewhat differently constructed chair.

In the embodiment illustrated in FIGS. 2 and 3 the pivots 50 and 51 used to support the arm 8 and the arm 40 holding the seat 4 upon the chair lower part 20, are combined into a common slide [stone 52] *stone or crosshead 52 of a crosshead guide assembly.* As shown in FIG. 3, the slide stone 52 is movable in a straight guide

*or crosshead guide* 53 having a horizontal guide path *or guiding way* and carried by the chair lower part 20. The guide 53 is so arranged that the arm 40 raises the seat 4 only when the back 3 has been inclined by more than 25° relatively to the vertical. Thus the tipping movement of the seat is retarded relatively to the movement of the back.

The movement of the chair starting with a steep position of the back takes place as follows:

The initial position of the seat is combined with an inclination of the back of about 15° to the vertical. This was found to be a particularly good position when a patient is getting off. When the back 3 is now inclined the seat 4 is initially moved only in the longitudinal direction. At a certain position of the back (about 25° to 35°) the slide stone 52 reaches its counter support in the guide 53. When the back 3 is further inclined from this position the seat 4 begins to rise toward the back by means of the arm 40 swinging about the [axle 5] *axle 51.*

Figure 4:
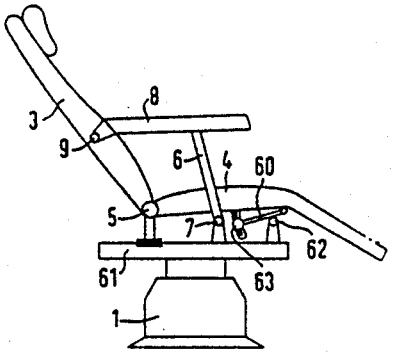
FIG. 4 is a side view of another chair construction.

The embodiment of FIG. 4 shows other means for coupling the tipping of the seat 4 with the movement of the back 3. In this construction the pivoted arm is replaced by a curved member 60 *(for purposes of illustration is shown as a substantially straight member)* located upon the lower part of the seat 4 and supported by a roller guide 62 fixed upon the lower chair portion 61. The angle of inclination of the curved member 60 can be changed by an adjusting screw 63 or the like, so that the tipping (rising) of the seat depending upon the inclination of the back can be adjusted individually.

Obviously, the curved member 60 can be also fixed upon the lower chair portion 61 while the roller guide 62 can be attached to the seat.

It was found advantageous to embody the required profile of the curved member 60 into the lower outline of the seat 4. The profile is advantageously so shaped that the ratio of the inclination of the back to the rising of the seat amounts to 3:1 to 2:1.

FIG. 5 shows an embodiment of the patients chair of the present invention wherein the seat is made of two parts, namely, it is divided into a seat support 70 and a leg support 72 connected with the seat support by a rotary hinge 71. The leg support 72 is provided with a curved member 73 which is also supported by a roller guide 74 connected with the lower chair portion 61. The curved member 73 is so arranged or its inclination can be adjusted in such manner that the leg support 72 is raised by a predetermined amount for a predetermined position of the back.

It should be also noted that the straight guide for the hinge 5 shown in the drawings does not have to be necessarily a horizontal guide path. It is possible within the scope of the present invention to make the guide path somewhat inclined to the horizontal, namely, in such manner that when the hinge 5 is moved longitudinally (when the back is inclined) the seat 4 is moved upon an inclined plane provided by the inclined guide path in the direction of a tipping seat movement.

As far as operation is concerned, it should be noted that the present invention solves the problem of adjusting the chair with small operational forces. According to the constructions of the present invention the upper chair part is well balanced in all positions. As already described, even when a patient is sitting on the chair, the balancing of the upper part of the chair is provided, since forces exerted upon the back substantially balance the forces exerted upon the seat consisting of a seat support and leg support. The resulting advantages consist in that the upper chair part can be also adjusted by hand and if a drive is provided, it must have only a comparatively small output.

Advantageously, a rotary drive can be provided for operating the chair which, for example, engages the hinge 5 or 9 and causes the swinging of the back. It is also possible to provide a straight drive, such as a hydraulic or pneumatic piston drive, which engages the seat as a suitable location of the straight guide.

As far as the technical structures of the slide guides 11, 21, 52 and 53, as well as the hinges 7, 9, 41, 42, 50 and 51, and the roller guides 62 and 74 are concerned, they are all usual parts readily available on the market, so that further description of these parts within the scope of the present invention is believed unnecessary.

It is also within the scope of the present invention to so construct the chair upper part receiving the hinges 5, 7, 42, 50 and 51 that in addition to adjustment in height it is swingable about an axis parallel to the longitudinal axis of the chair. In that case an intermediate carrier is necessary which would be preferably arranged between the horizontal part and the vertical part of the lower chair part 2 adjustable in height in the base 1.

For the purposes of the present invention it is immaterial whether the hinge connecting the back with the seat is shiftable in a longitudinal guide. Actually means supporting the seat in the longitudinal guide can be provided at any desired suitable place.

What is claimed is:

1. A chair for dental patients, comprising a lower portion and an upper portion, said upper portion having a back, a seat, and a hinge connecting the lower end of said back with the rear end of said seat, said upper and lower portions having means for supporting and moving said seat in a longitudinal direction, said means including crosshead [guides] *guide assemblies,* one part of *each of* said crosshead [guides] *guide assemblies* being connected with the seat and the other part with the lower portion, [the chair] *said means* having rods with ends connected about a horizontal axis transverse to the longitudinal axis of the chair with said back and other ends connected with said lower portion, *at least one of the rods providing an arm support for the chair,* and means interposed between said seat and said lower portion and away from said hinge for tipping said seat about a horizontal axis toward said back when said back is inclined.

2. A chair in accordance with claim 1 wherein the second-mentioned means comprise a curved member and a roller guide engaging said curved member.

3. A chair in accordance with claim 1 wherein the second-mentioned means comprise a supporting arm pivotally connected with said seat and said lower portion.

4. A chair in accordance with claim 2, wherein said curved member is so shaped that the tipping of the seat begins when the back is inclined by more than 25° to the vertical.

5. A chair in accordance with claim 3, wherein said supporting arm is of such length and so connected that the tipping of the seat begins when the back is inclined by more than 25° to the vertical.

6. A chair in accordance with claim 3, [comprising] *wherein the crosshead guide assemblies including* crosshead guides having a horizontal guiding way and *being* carried by said lower portion, *and* said supporting arm

*being connected with a crosshead or longitudinal displacement within the guiding ways.*

7. A chair in accordance with claim 3, comprising a common bearing upon said lower portion for said rods and said supporting arm.

8. A chair in accordance with claim 6, [comprising] *wherein said crosshead comprises* a sliding block movable upon said crosshead guides and constituting a bearing for said supporting arm and said rods.

9. A chair in accordance with claim 1, wherein said upper portion comprises a seat part, a leg supporting part and a rotary hinge interconnecting said parts, a curved member carried by said leg supporting part and a roller member carried by said lower portion and engaging said curved member to swing said leg supporting part about said rotary hinge when said seat is moved longitudinally.

10. A chair in accordance with claim 9, wherein said curved member is adjustable.

[11. A chair in accordance with claim 1, comprising a rotary drive for inclining said back and having a driving axle coinciding with the connection of said rods with said back.]

12. A chair in accordance with claim 1, wherein said rods [constitute arm supports,] *includes* cardan joints connecting said rods with said back and said lower portion.

13. A chair in accordance with claim 1, wherein said *crosshead guide assemblies include* crosshead guides having sliding bearings.

* * * * *